United States Patent
Hombert

(10) Patent No.: US 10,234,988 B2
(45) Date of Patent: Mar. 19, 2019

(54) USER-TRACKABLE MOVING IMAGE FOR CONTROL OF ELECTRONIC DEVICE WITH TOUCH-SENSITIVE DISPLAY

(71) Applicant: BlackBerry Limited, Waterloo (CA)

(72) Inventor: Jonas Hombert, Stockholm (SE)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 14/040,878

(22) Filed: Sep. 30, 2013

(65) Prior Publication Data

US 2015/0091811 A1    Apr. 2, 2015

(51) Int. Cl.
G06F 3/041       (2006.01)
G06F 3/0488      (2013.01)
H04M 1/67        (2006.01)
G06F 21/36       (2013.01)
G06F 1/16        (2006.01)

(52) U.S. Cl.
CPC ........ *G06F 3/0418* (2013.01); *G06F 3/04883* (2013.01); *G06F 21/36* (2013.01); *H04M 1/67* (2013.01); *G06F 1/1626* (2013.01); *G06F 2203/04106* (2013.01); *H04M 2250/22* (2013.01)

(58) Field of Classification Search
CPC ............. G06F 3/04883; G06F 3/04817; G06F 3/0418; G06F 21/36; G06F 2203/04106; G06F 1/1626; H04M 1/67; H04M 2250/22
USPC .......................................... 345/173; 715/741
See application file for complete search history.

(56) References Cited

U.S. PATENT DOCUMENTS 4,972,496 A    11/1990   Sklarew
5,545,857 A *   8/1996   Lee ...................... G06F 3/0488
                                           178/18.03
6,572,378 B1 *  6/2003   Rehkemper ........... G09B 11/04
                                           345/173

(Continued)

FOREIGN PATENT DOCUMENTS

CN        102819383        12/2012
EP         2629185          8/2013

(Continued)

OTHER PUBLICATIONS

EESR dated Feb. 2, 2015, received for European Application No. 14186970.1.

(Continued)

*Primary Examiner* — Vinh T Lam
(74) *Attorney, Agent, or Firm* — Thomas Grzesik; Fleit Gibbons Gutman Bongini & Bianco P.L.

(57) ABSTRACT

The present disclosure provides an electronic device and a method of operation thereof, in which accidental, careless or unintended user input is mitigated. A sequence of frames is displayed on a touch-sensitive display of the electronic device to depict an image moving in an image path over a time interval. A user touch path, generated in response to the moving image, is sensed over the time interval. The image path is compared with the user touch path to determine a path tracking accuracy and the electronic device is controlled responsive to the determined path tracking accuracy. In this manner, unlocking an electronic device and selection of a device function may be achieved by a single user action.

28 Claims, 8 Drawing Sheets

(56) References Cited

U.S. PATENT DOCUMENTS

| | | | |
|---|---|---|---|
| 6,802,717 B2* | 10/2004 | Castro | G09B 11/00 |
| | | | 345/173 |
| 7,657,849 B2 | 2/2010 | Chaudhri et al. | |
| 8,248,385 B1 | 8/2012 | Paul | |
| 8,504,842 B1 | 8/2013 | Meacham | |
| 9,326,147 B2* | 4/2016 | Nakazawa | G06F 3/0483 |
| 9,454,303 B2* | 9/2016 | Andres | G11B 27/005 |
| 9,519,762 B2* | 12/2016 | Williams | G06F 21/31 |
| 2007/0150842 A1* | 6/2007 | Chaudhri | G06F 3/04883 |
| | | | 715/863 |
| 2008/0048991 A1* | 2/2008 | Freeman | G09B 5/02 |
| | | | 345/173 |
| 2008/0087797 A1* | 4/2008 | Turnbull | B60R 1/12 |
| | | | 250/206.1 |
| 2008/0122796 A1* | 5/2008 | Jobs | G06F 3/0488 |
| | | | 345/173 |
| 2008/0309616 A1 | 12/2008 | Massengill | |
| 2009/0231296 A1* | 9/2009 | Besshi | G06F 3/04883 |
| | | | 345/173 |
| 2010/0199180 A1* | 8/2010 | Brichter | G06F 3/0482 |
| | | | 715/702 |
| 2010/0306705 A1 | 12/2010 | Nilsson | |
| 2011/0157046 A1* | 6/2011 | Lee | G04G 21/08 |
| | | | 345/173 |
| 2011/0191675 A1* | 8/2011 | Kauranen | G06F 3/04847 |
| | | | 715/702 |
| 2011/0214082 A1* | 9/2011 | Osterhout | G02B 27/017 |
| | | | 715/773 |
| 2011/0271181 A1 | 11/2011 | Tsai et al. | |
| 2012/0054057 A1 | 3/2012 | O'Connell et al. | |
| 2012/0194457 A1* | 8/2012 | Cannon | G06F 3/011 |
| | | | 345/173 |
| 2012/0278766 A1* | 11/2012 | Massengill | A61B 3/113 |
| | | | 715/846 |
| 2013/0082965 A1* | 4/2013 | Wada | G06F 3/04883 |
| | | | 345/173 |
| 2013/0234971 A1* | 9/2013 | Li | G06F 3/04883 |
| | | | 345/173 |
| 2013/0250034 A1* | 9/2013 | Kang | H04W 4/02 |
| | | | 348/14.02 |
| 2013/0263055 A1* | 10/2013 | Victor | G06F 3/0485 |
| | | | 715/835 |
| 2013/0271400 A1* | 10/2013 | Yao | G06F 3/041 |
| | | | 345/173 |
| 2013/0321297 A1 | 12/2013 | Li | |
| 2014/0109018 A1* | 4/2014 | Casey | G06F 3/04895 |
| | | | 715/863 |
| 2014/0176468 A1 | 6/2014 | Dang et al. | |
| 2014/0282272 A1* | 9/2014 | Kies | G06F 3/013 |
| | | | 715/863 |
| 2015/0015493 A1* | 1/2015 | Hsieh | G06F 3/0488 |
| | | | 345/173 |
| 2016/0188181 A1* | 6/2016 | Smith | G06F 3/048 |
| | | | 715/765 |

FOREIGN PATENT DOCUMENTS

| | | |
|---|---|---|
| WO | 2010040670 | 4/2010 |
| WO | 2013056673 | 4/2013 |

OTHER PUBLICATIONS

European Examination Report dated Mar. 17, 2017, received for European Application No. 14186970.1.
Summons to attend oral proceedings pursuant to Rule 115(1)EPC, for European Application No. 14186970.1 dated Apr. 25, 2018.
Decision to Refuse a European Patent Application dated Nov. 29, 2018 for European Patent Application No. 14186970.1.
Minutes of the Oral Proceedings before the Examining Division for European Patent Application No. 14186970.1 held on Oct. 16, 2018.

* cited by examiner

USER-TRACKABLE MOVING IMAGE FOR CONTROL OF ELECTRONIC DEVICE WITH TOUCH-SENSITIVE DISPLAY

BACKGROUND

A touch-sensitive display or screen of an electronic device provides a graphical user interface that enables user control of the electronic device. Control is determined from either the relationship between one or more touch positions on the display and static images displayed on the display, or from motion of the touch position that may be recognized as a gesture. A problem with this approach is that a virtual button presented on the user interface may be pressed accidentally or unintentionally. One attempted solution is to require a sequence of buttons to be pressed, such as by typing a password or number on a virtual keypad. However, after repeated use, such an unlocking action may become automatic and still allow accidental activation of a user control of the device. In addition, unlocking the device must be performed as an additional step, so that to launch an application on a smart phone, for example, the phone must first be unlocked and then the application must be selected.

It would be useful to provide an improved user interface that prevents accidental, unintended or careless control of an electronic device having a touch-sensitive display. Further, it would be useful to provide a means for unlocking a device and activating device operation in a single step.

BRIEF DESCRIPTION OF THE DRAWINGS

Exemplary embodiments of the present disclosure will be described below with reference to the included drawings such that like reference numerals refer to like elements and in which.

DETAILED DESCRIPTION

Figure 1:
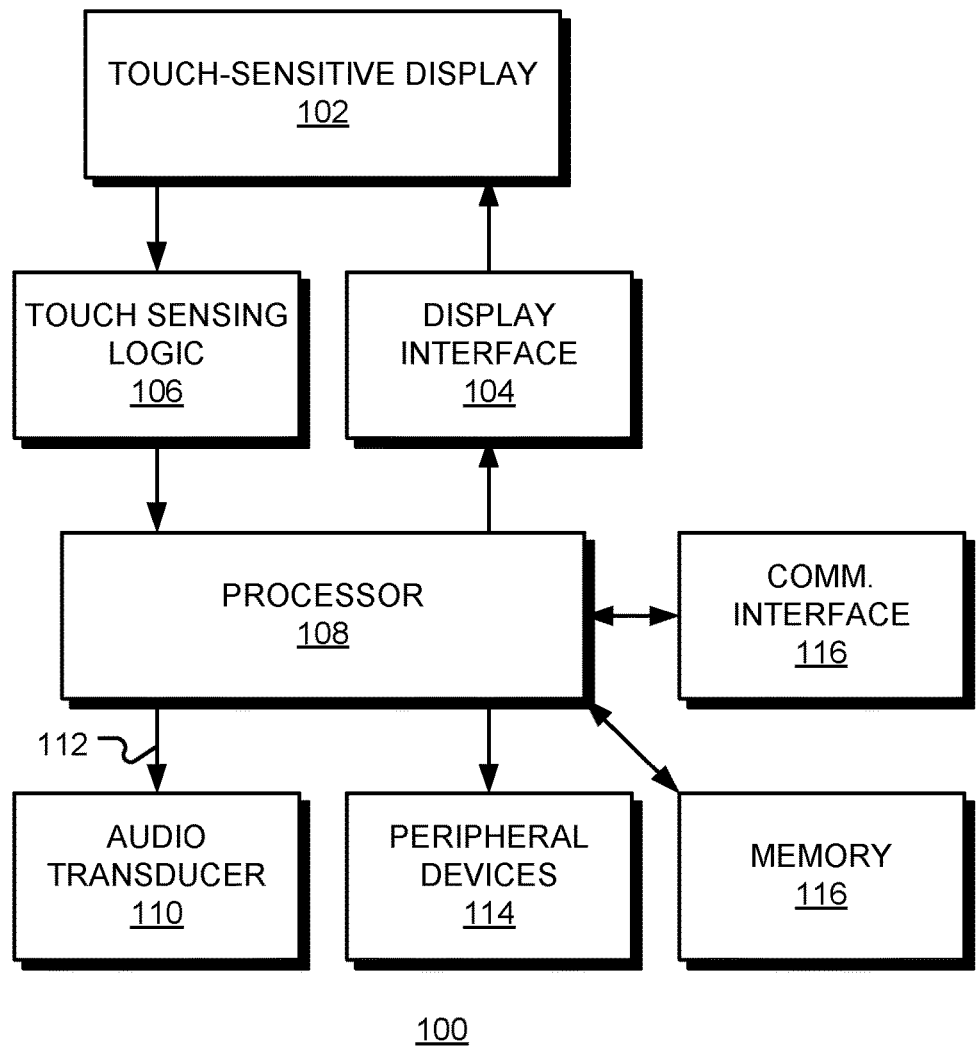
FIG. 1 is a block diagram of an electronic device, in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

The present disclosure relates to an interface for an electronic device, such as a computer, smart phone, tablet computer, personal digital assistant and the like, having a touch-sensitive surface. The interface provides a means for interacting with the electronic device that prevents accidental, unintended or careless input by a user.

In an exemplary embodiment, an electronic device includes a touch-sensitive display, a processor coupled to the display, and a memory coupled to and in cooperative arrangement with the processor. The processor and memory are configured to display a sequence of frames on the touch-sensitive display that depict an image moving in image path over a time interval and to receive data representative of a user touch path over the time interval in response to user contact with the touch-sensitive display. The user touch path is compared with the image path to determine a path tracking accuracy of the user touch path relative to the image path, and operation of the electronic device is controlled in response to the path tracking accuracy.

In a further exemplary embodiment, an electronic device displays a sequence of frames on a touch-sensitive display of the electronic device to depict an image moving in an image path over a time interval, senses a user touch path on the touch-sensitive display over the time interval, compares the image path with the user touch path to determine a path tracking accuracy of the user touch path, and controls the electronic device in response to the determined path tracking accuracy of the user touch path.

In a still further exemplary embodiment, an electronic device, in a locked mode of operation, displays a plurality of images on a touch-sensitive display of the electronic device, each image associated with a selectable function of the electronic. In response to sensing a user touch of a selected image of plurality of images, the electronic device displays a sequence of frames on a touch-sensitive display of the electronic device to depict an image moving in an image path over a time interval, senses a user touch path on the touch-sensitive display over the time interval and compares the image path with the user touch path to determine a path tracking accuracy of the user touch path. If the path tracking accuracy is above an accuracy threshold, the electronic device is unlocked and the function associated with the selected image is performed.

FIG. 1 is a block diagram of an exemplary electronic device, in accordance with exemplary embodiments of the present disclosure. Referring to FIG. 1, the device 100 includes a touch-sensitive display 102 operable to display a sequence of frames from a display interface 104 that depicts an image moving in an image path over a time interval. The device 100 also includes touch sensing logic 106, which is responsive to user contact with the touch-sensitive display 102 to generate a user touch path over the time interval, and a processor 108. The processor 108 is operable to provide the sequence of frames to the touch-sensitive display, via display interface 104, and to receive the user touch path from the touch sensing logic 106. The processor 108 is further operable to compare the image path with the user touch path to determine a path tracking accuracy, and to control execution of the device 100 dependent upon the path tracking accuracy.

The processor 108 may be controlled by a program of processor-executable instructions. These instructions may be stored in a transitory or non-transitory processor-readable medium.

The time interval over which the image is moved along the path may begin when a user touch is detected within the image. In operation, it is highly unlikely that an accidentally or carelessly generated user touch path will match the image path, so unintentional user touch input is mitigated.

The user touch may be provided by a finger of the user, by a stylus, or by another pointing device.

The image may be an image of an object, such as a button, that is sequentially displayed at different locations on the display to give an impression of movement. The image path may be, for example, straight, curved, or angled. The rate of change of position of the object may be constant or varying over the time interval. Thus, dependent upon the complexity and speed of the motion of the object, various levels of attention may be required of the user to enable the user to track the moving object over the time period. The level may be predetermined and may be configurable by a user or other operator.

The device 100 may also include an audio transducer 110 driven by an audio signal 112. The processor may be operable to control the audio signal over the time interval dependent upon the image path and the user touch path. For example, the audio signal may be an alarm and the level of the alarm may be decreased when the user touch path substantially matches the image path. In this manner, suppression of the alarm requires careful attention by the user over the time interval, and accidental or careless suppression of the alarm is mitigated. The device 100 may also include other peripheral devices 114, such as input/output devices, memory devices and the like, and one or more communication interfaces 116 for long or short range communication with other devices, local networks, wireless telephone networks, the Internet and the like.

The memory 116 is coupled to, and in cooperative arrangement with, the processor 108 and may be used for storing data and computer executable instructions for controlling the processor.

Other common components, such as clocks and power supplies, have been omitted for clarity.

Figure 2:
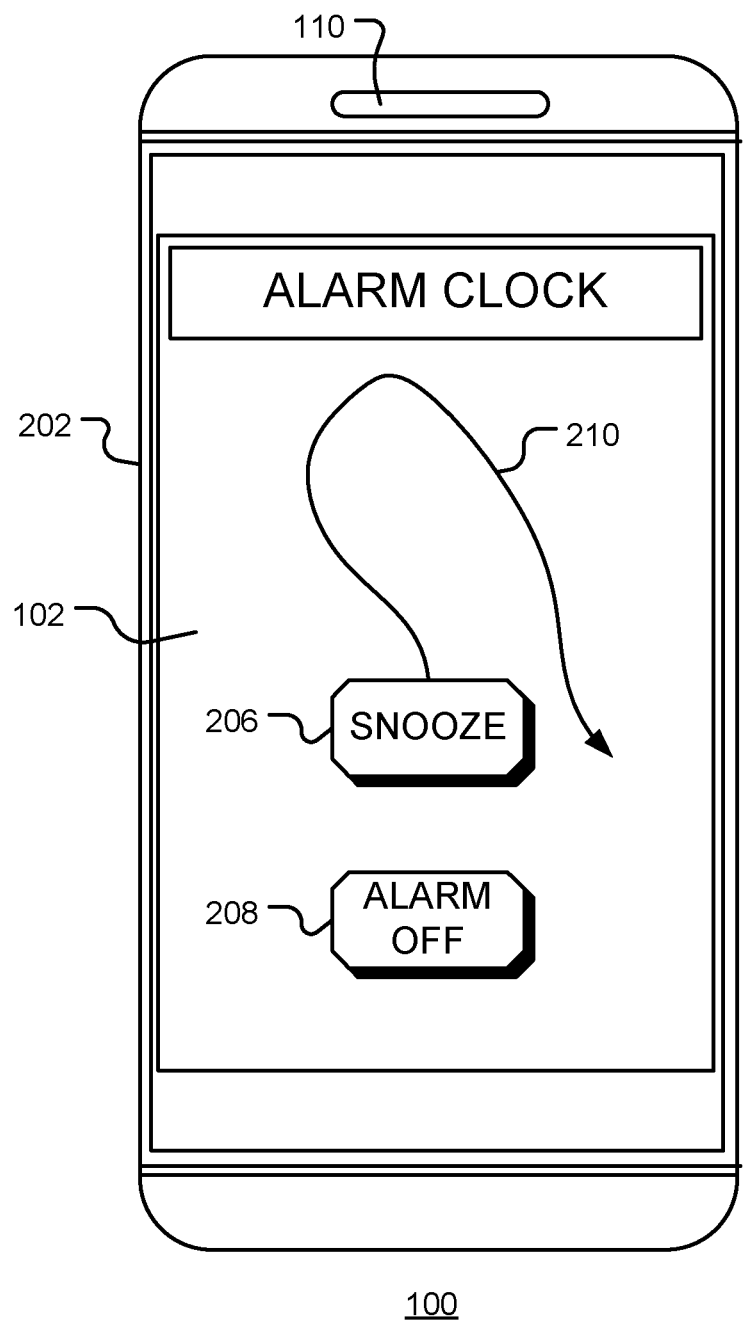
FIG. 2 is a diagrammatic view of an electronic device, in accordance with exemplary embodiments of the present disclosure.

FIG. 2 is a diagrammatic view of an exemplary electronic device 100, in accordance with exemplary embodiments of the present disclosure. In this example, the electronic device 100 comprises a smart phone for which the processor and other components are held by casing 202. In this example, the smart phone is operable to execute an alarm clock application in which, at a selected time, an alarm is sounded by audio transducer 110. Images of a 'snooze' button 206 and a 'stop' button 208 are displayed on the touch-sensitive display 102. When a user touch is sensed in the region of snooze button 206, the displayed button begins to move across the display 102 in an image path as indicated by the arrow 210. The image path may be displayed to the user as a visual aid, or may not be displayed. In order to silence the alarm, a user is required to be awake enough to be able to track the button 206, as it moves across the display 102, with sufficient accuracy over some time period. The time period may be in the range of approximately 1-5 seconds, the range of approximately 3-8 seconds, or some other time period, and may be user-selectable. If the user's tracking accuracy is sufficiently high, the alarm is silenced and the device is controlled to enable a snooze feature; otherwise the alarm continues. Similarly, if a user touch is sensed in the region of the stop button 208, the stop button 208 begins to move in an image path across the display 102 and must be tracked by the user to disable the alarm and activate the stop feature.

Figure 3:
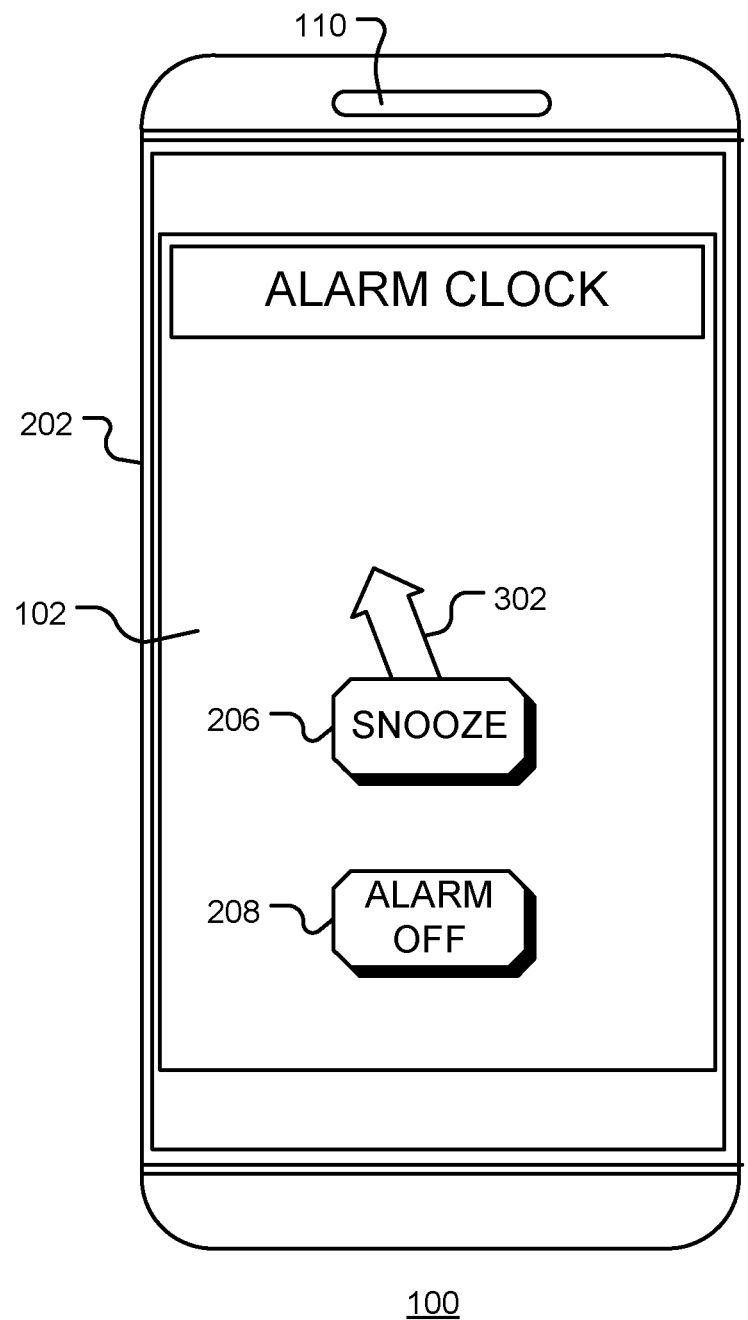
FIG. 3 is a further diagrammatic view of an electronic device, in accordance with exemplary embodiments of the present disclosure.

FIG. 3 is a further diagrammatic view of an electronic device, in accordance with exemplary embodiments of the present disclosure. The embodiment shown in FIG. 3 is similar to that shown in FIG. 2, but the direction of motion of the snooze button 206 is indicated by arrow 302. The arrow 302 is displayed to provide a visual aid to the user. When the image path is curved, for example, the direction of motion of arrow 302 changes as the button 206 moves across the touch-sensitive display 102. When the image path is a straight line, the direction of arrow 302 remains constant.

The touch path of a user may be used to select and move images displayed on the display, so that the displayed object moves in response to the user's touch. In contrast, in the device disclosed above, the user's touch is produced in response to movement of the displayed object, rather than the other way around. Additionally, the user's touch path may be tracked by the device to provide a predefined 'gesture' input to the device; that is, the device tracks the user's motion. In contrast, in the device and methodology disclosed herein, the image path is not known to the user in advance and the user is required to track the motion of the image displayed by the device.

In an exemplary embodiment, an electronic device is operated by displaying a sequence of frames on a touch-sensitive display of the electronic device to depict an image moving in an image path over a time interval, sensing a user touch path on the touch-sensitive display over the time interval, comparing the image path with the user touch path to determine a path tracking accuracy of the user touch path, and controlling the electronic device responsive to the determined path tracking accuracy of the user touch path. The method may be performed by a processor of the electronic device that executes computer-executable instructions. The computer-executable instructions may be stored in a non-transitory computer-readable medium, for example.

Figure 4:
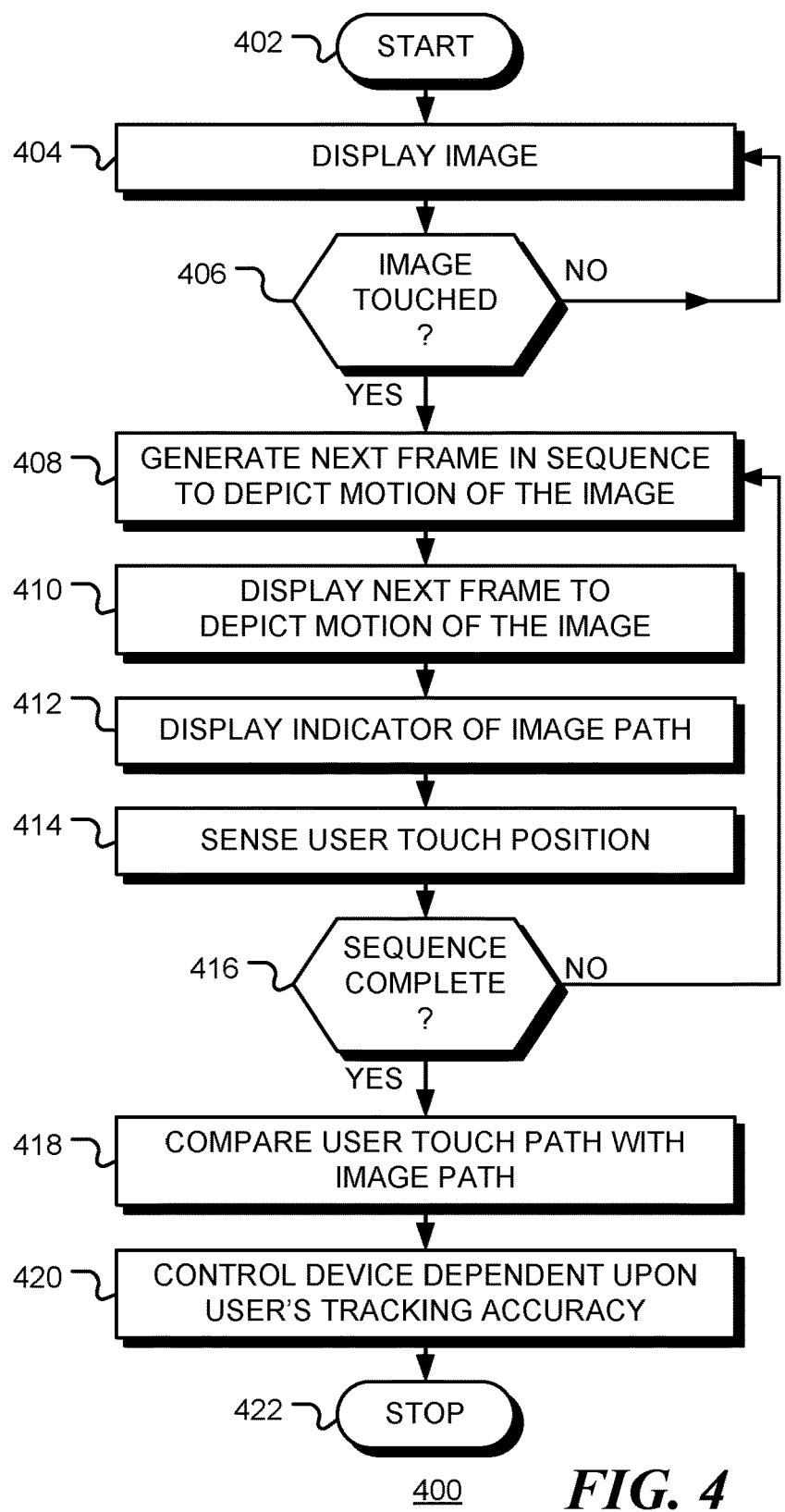
FIG. 4 is a flow chart of a method for controlling an electronic device, in accordance with exemplary embodiments of the present disclosure.

FIG. 4 is a flow chart 400 of a method for controlling an electronic device, in accordance with exemplary embodiments of the present disclosure. Following start block 402 in FIG. 4, an image is displayed on the touch-sensitive display of the electronic device at block 404. The image may be an image of a button, for example, or some other image. Generally, the image is part of a complete graphics frame displayed by the device and so occupies a region of the frame. Other regions of the frame may include additional graphical content such as pictures, icons, text, etc. In one embodiment, the image is related to the other graphical content such that the image appears as an object moving in a virtual environment. If a user touch is detected in the region of the display where the image is displayed, as depicted by the positive branch from decision block 406, a sequence of frames is displayed to depict movement of the image across the touch-sensitive display. Otherwise, as depicted by the negative branch from decision block 406, the image remains stationary. The sequence of frames depicting motion of the image along an image path proceeds with generating a next frame in the sequence of frames at block 408, displaying the next frame at block 410 and, optionally, displaying an indicator of the image path or motion at block 412. As described above, the indicator may be a depiction of the image path, an indication of the direction of motion, or some other indicator. At block 414, a user touch position is sensed to provide a position along the user touch path. If the sequence of frames is not complete, as depicted by the negative branch from decision block 416, flow returns to block 408, and another frame is generated and displayed. In this way, a sequence of user touch positions are sensed, describing a user touch path. If the sequence of frames is complete, as indicated by the positive branch from decision block 416, the user touch path is compared with the image path, at block 418, to determine the user's tracking accuracy. Completion may be determined, for example, as the display of a selected number of frames, or the achievement or failure of a user to achieve a selected tracking accuracy. At block 420, the user's tracking accuracy is used as an input to control the device. From example, the tracking accuracy could be compared to an accuracy threshold to determine a binary input to the device, such as a "yes/no", "on/off", or "start/stop" input. Alternatively, or in addition, the degree of accuracy may be used to provide a quantitative input to the device.

In this manner, accidental or careless user input to the device is mitigated. While described above with application to a smart phone, the method may be used on any device having a touch-sensitive display to validate the alertness, attention, or cognitive state of a user. For example, a moving 'start' button may be displayed on an in-vehicle display of an automobile. Accurate tracking of the button over a period of time may be sensed to assess a user's fitness for driving. Similarly, a moving start button may be used to activate a machine to prevent accidental operation.

Again, the image path may be a straight line path, a curved path, an angled (zig-zag) path, a combination of these, or other type of path. In addition, the rate of change of position with respect to time of the image may vary over the time interval. The complexity of the path may be fixed or selected in advance.

Assistance to the user may be provided by displaying an indicator of the image path during the time interval. For example, a line may be displayed showing the future path of the image. Alternatively, or in addition, for each frame of the sequence of frames, an indicator of the direction of motion of the image may be displayed. For example, an arrow may be displayed pointing in the direction of motion or the direction of the arrow may be varied over the time interval if the direction of motion varies.

A visual indicator of the path tracking accuracy may be displayed over the time interval. For example, a bar, line plot, or gauge may be displayed.

The image path may be compared with the user touch path by determining where a user touch is with respect to the image during the time period. A binary input may be determined by measuring the time that the user touch is outside the region of the displayed image and comparing that time to an accuracy threshold.

In a further embodiment the path tracking accuracy may be determined by measuring the distance from a user touch position to an image position during the time period. A binary input may be determined by comparing the distance to a threshold distance.

Alternatively, a time integral of distances from a user touch position to an image position during the time period may be determined. This may be used to provide a level input, or compared with an accuracy threshold to provide a binary input.

In one embodiment, the time interval is dependent upon the path tracking accuracy. For example, if user tracking accuracy is initially poor, the time interval may be extended to provide an opportunity for improved tracking.

The image path may be selected at random by the processor. The image path may be determined by a sequence of image locations, or may be determined parametrically. The path may be generated in advance as a sequence of display positions or as a sequence of frames to be displayed. Alternatively, the path may be generated when needed, allowing for adaptation of the path trajectory and speed.

Figure 5:
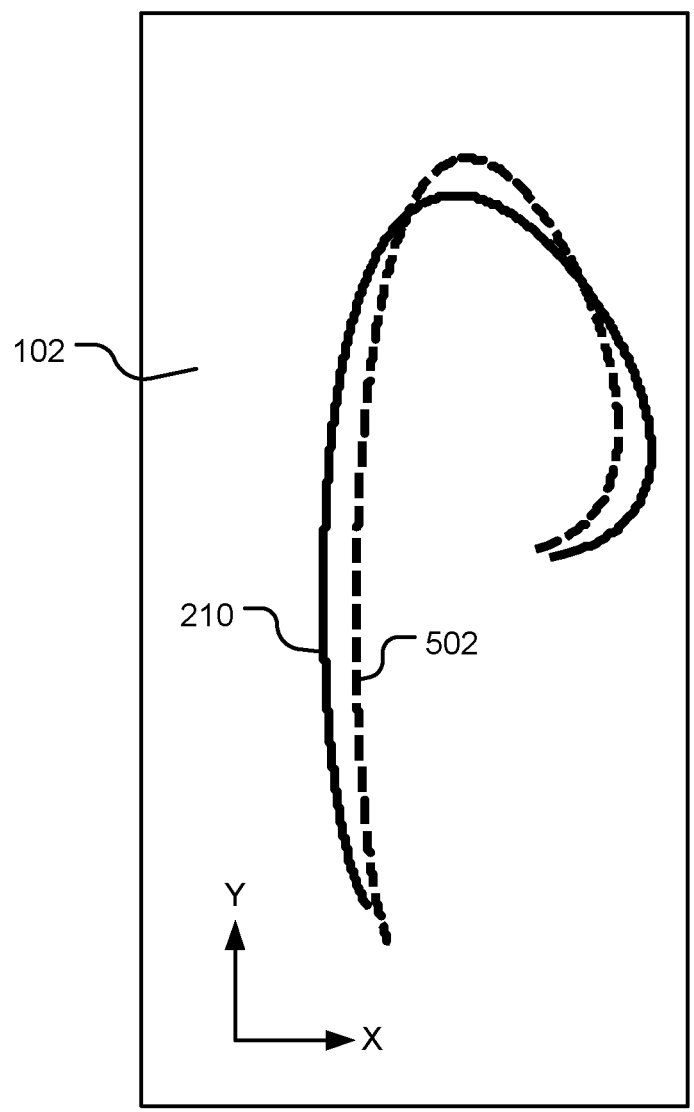
FIG. 5 is a diagrammatic representation of an image path and a corresponding user touch path.

FIG. 5 is a diagrammatic view of a touch-sensitive display 102, in accordance with exemplary embodiments. In this view, an image path 210 and a user touch path 502 are shown. The user touch path 502 is produced in response to an image moving along the image path 210. In this example it can be seen that the user touch path matches the image path fairly closely, but not exactly. In practice, either path can be displayed or not displayed on the touch-sensitive display 102. The horizontal direction is labeled as 'X' and the vertical direction is labeled as 'Y' for reference in the sequel.

Figure 6:
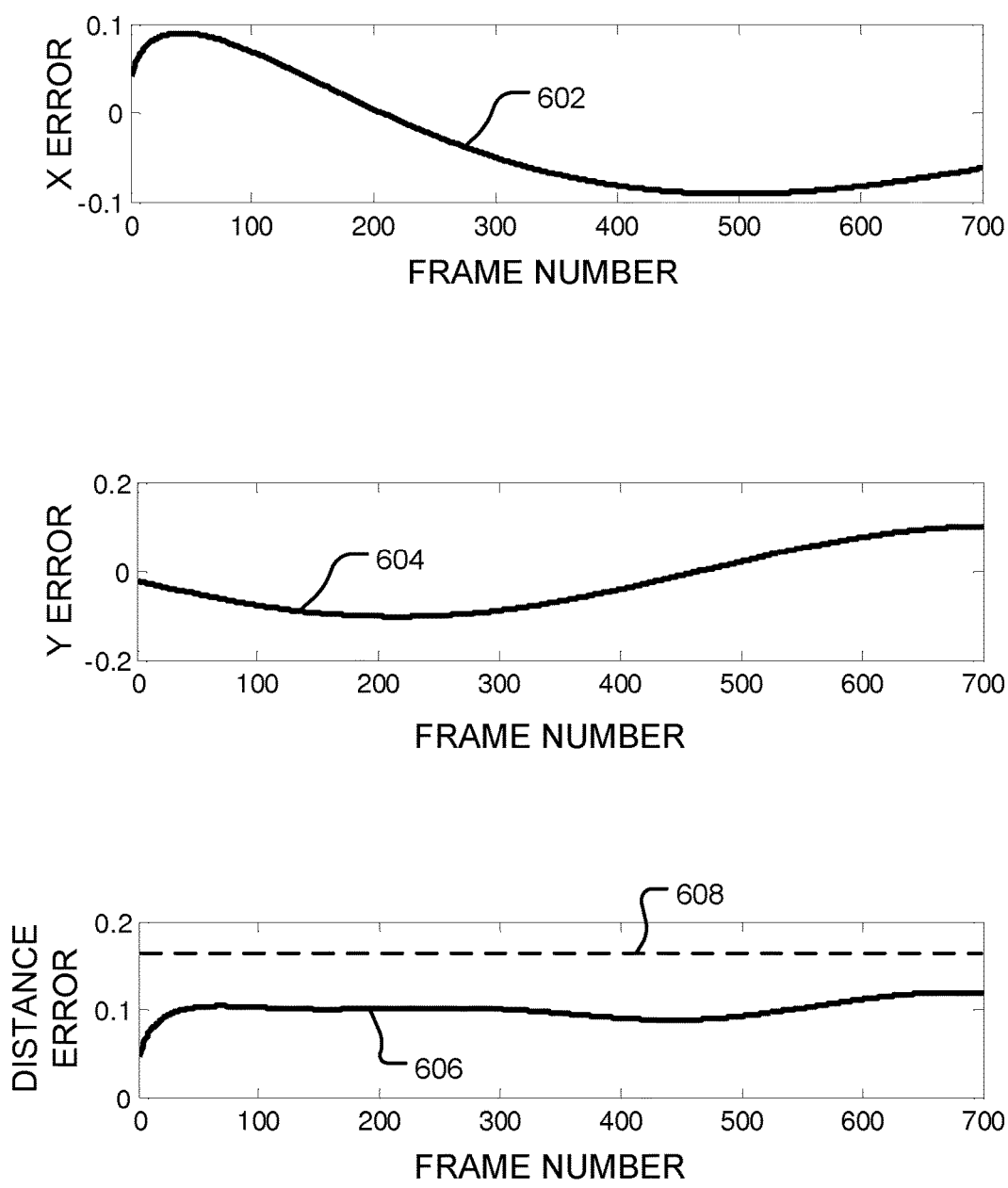
FIG. 6 shows plots of user tracking errors, in accordance with exemplary embodiments of the present disclosure.

FIG. 6 shows plots of the tracking errors associated with the exemplary paths shown in FIG. 5. The errors are shown as a function of the elapsed time, measured in frames, since the image motion began. The upper plot shows the error 602 between the X-position of the image path and the X-position of the user touch path. In this example the units are inches, but pixel units or other units may be used. The middle plot shows the error 604 between the Y-position of the image path and the Y-position of the user touch path. The lower plot shows the distance 606 between the user touch position and the image position as a function of time (frame number). In this embodiment, matching in both time and position is measured. In a further embodiment only position error is measured. In one embodiment, the distance error may be used to determine the input to the device. For example, if the distance error 606 remains below a threshold 608 for the entire period, a logical '1' is entered. Otherwise, if the distance error 606 exceeds the threshold 608 a logical '0' is entered. In the example shown, a logical '1' is entered since the error 606 remains below the threshold 608. Alternatively, an audio signal may be reduced in level while distance error 606 remains below the threshold 608, but increased in level if the distance error 606 exceeds the threshold 608. Still further, the average or total distance error may be compared to a threshold. It will be apparent to those of skill in the art that other measures of a user's tracking accuracy may be used without departing from the present disclosure.

Figure 7:
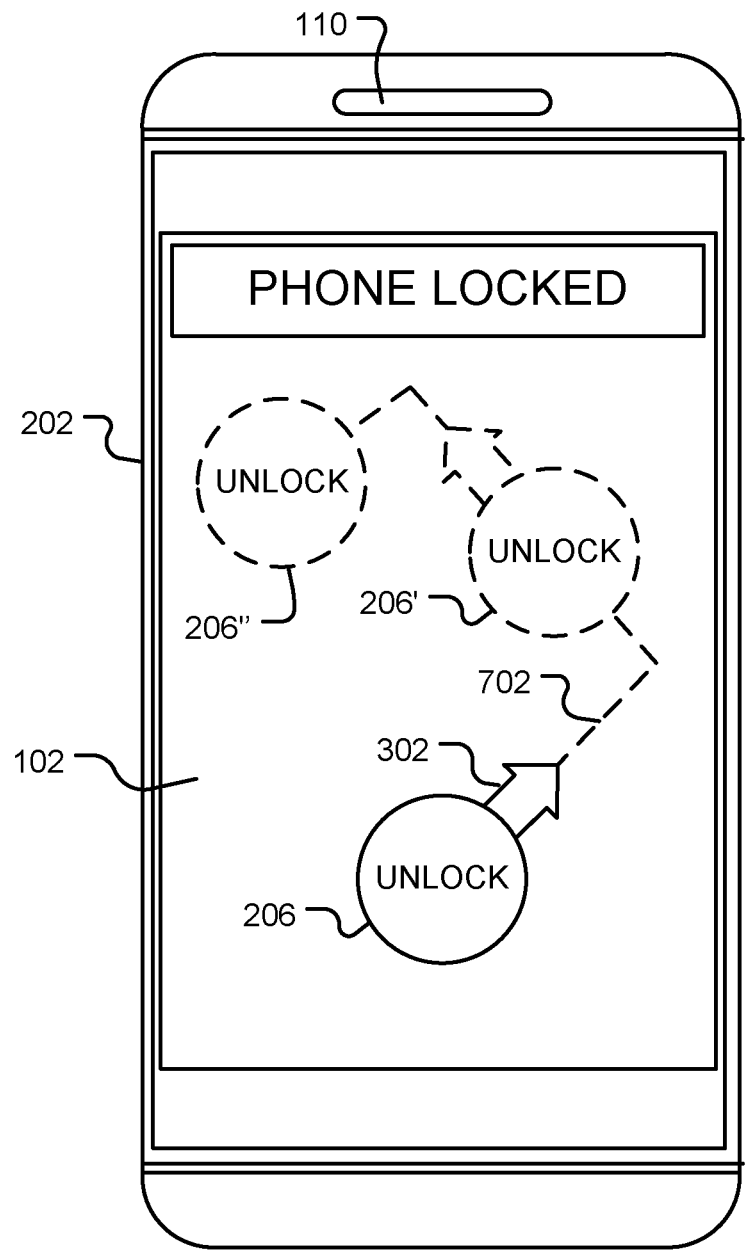
FIG. 7 is a diagrammatic view of an electronic device, in accordance with exemplary embodiments of the present disclosure.

FIG. 7 is a diagrammatic view of an electronic device, in accordance with exemplary embodiments of the present disclosure. In this example, a moving 'unlock' button 206 is displayed on the display of a smart phone 100 or other portable electronic device. In order to 'unlock' the device and make it operational, a user must touch and then follow the button 206 as it moves along an image path 702. The button 206 begins moving when touched and moves along the path 702 over a time interval. At an intermediate time, the button is displayed as 206', for example, and at the end of the interval the button is displayed as 206". If the user's touch follows the button 206 with sufficient accuracy as it moves, the device is unlocked. Otherwise, the device remains locked. Again, this approach prevents accidental unlocking of the device. The moving image (the button 206 in this example) presents a device-generated 'gesture' to the user that the user must mimic. The gesture may be varied to prevent a user response becoming automatic.

Figure 8:
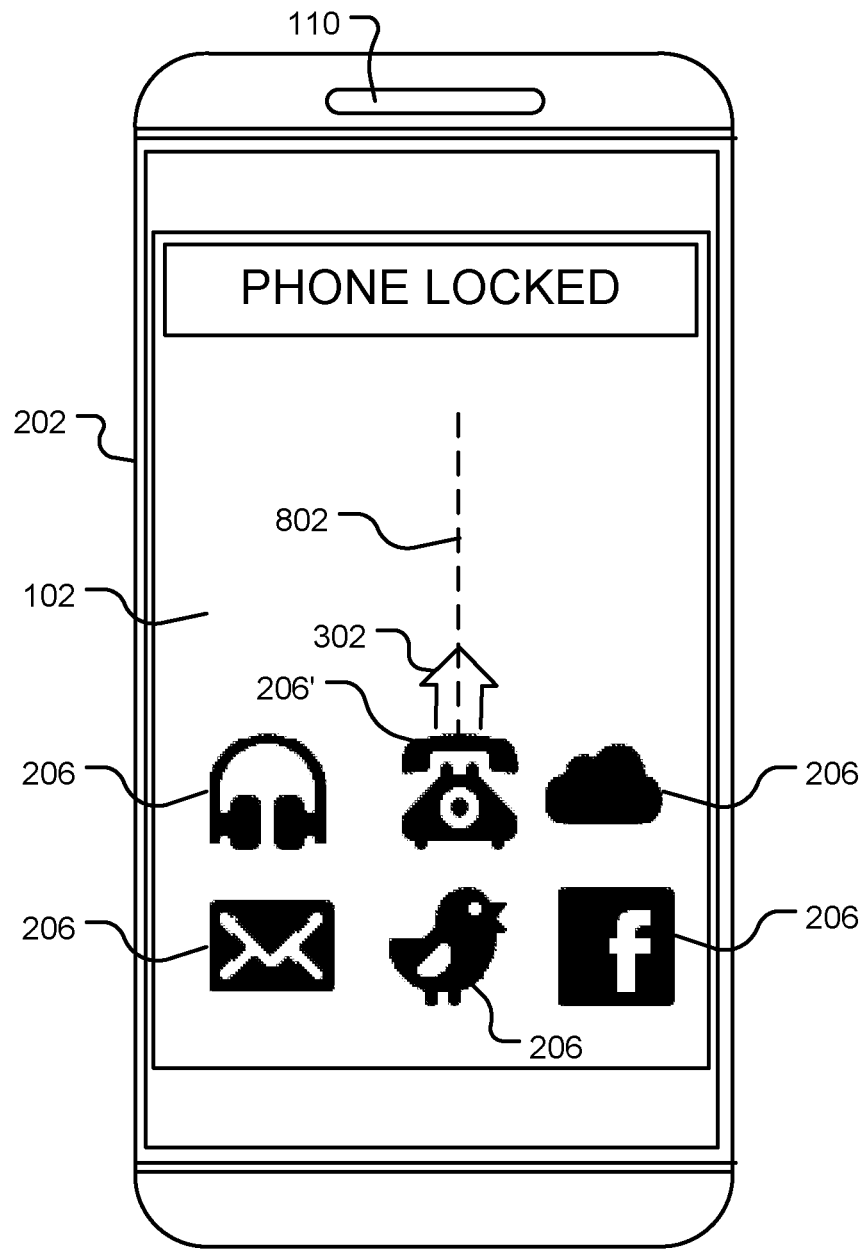
FIG. 8 is a diagrammatic view of an electronic device, in accordance with further exemplary embodiments of the present disclosure.

FIG. 8 is a diagrammatic view of an electronic device in accordance with further exemplary embodiments of the present disclosure. In the example shown, the device 100 is unlocked and an application is selected by a single user action. In the locked mode, one or more images 206 are displayed on the touch-sensitive display of the device 100. In this embodiment, the images are icons associated with various functions that may be executed on the device. When a user touches an image, such as image 206', the image begins to move. In this example, the icon 206' begins to move upwards along the path indicated by broken line 802. The path may be indicated to the user by an arrow, or by a line such as line 802, or by some other means. Alternatively, no indication may be provided. The path may be a straight line, as illustrated, or another type of line. The image path may be the same each time the button is pressed, or may change from one activation to the next.

In this way, a user is able to unlock the device and select the application associated with icon 206' by a single action. Prior techniques require a two-step process, namely (1) unlock the device and (2) select the application or device function.

One device function may be a telephone application, in which case a user may unlock the device and select the telephone application to make a telephone call with a single user action, namely, tracking a moving icon or image. Similarly, when an incoming call is received, the user may accept the call by tracking the associated moving image or icon. In this example, the level of the ring tone may be reduced as the image is tracked so as to provide audible feedback to the user. In this way, accidental answering of an incoming call on a smart phone in a pocket or bag is avoided.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An electronic device, comprising:
   a touch-sensitive display;
   a processor coupled to the touch-sensitive display; and
   a memory coupled to and in cooperative arrangement with the processor, the processor and memory configured to:
   detect a user touch within a given area of a displayed image, the displayed image comprising at least one characteristic indicating one or more functions of an application to be performed based on user interaction with the displayed image;
   based on the user touch having been detected, display an initial subset of frames from a sequence of frames on the touch-sensitive display prior to a subsequent user ouch, the initial subset of frames depicting the displayed image moving in an image path over a time interval to be followed by a user touch path as a condition to perform the one or more functions of the application;
   after the initial subset of frames has been displayed, detect a plurality of subsequent user touches defining the user touch path, wherein for each subsequent touch of the plurality of subsequent touches display a different subset of frames from the sequence of frames on the touch-sensitive display, wherein each different subset of frames depicts the displayed image moving in a different image path over the time interval to be followed by the user touch path;
   receive data representative of the user touch path in response to the plurality of subsequent user touches having been detected;
   compare the user touch path with the image path to determine a path tracking accuracy of the user touch path relative to the image path; and
   control operation of the electronic device responsive to the path tracking accuracy, the operation of the electronic device being controlled by at least performing the one or more functions of the application.

2. The electronic device of claim 1, wherein the time interval begins when the user touch is detected within the displayed image.

3. The electronic device of claim 1, where the displayed image comprises an icon selected from one or more icons displayed on the touch-sensitive display and where the electronic device is controlled by the processor to perform a function associated with the selected icon if the path tracking accuracy exceeds an accuracy threshold.

4. The electronic device of claim 1, where the electronic device is operated in a locked mode until the path tracking accuracy exceeds an accuracy threshold and is operated in an unlocked mode if the path tracking accuracy exceeds the accuracy threshold.

5. The electronic device of claim 1, further comprising an audio transducer, where the processor is further operable to control an audio signal over the time interval dependent upon the image path and the user touch path.

6. The electronic device of claim 5, where the audio signal comprises an alarm and where the level of the alarm is decreased in response to the user touch path substantially matching the image path.

7. The electronic device of claim 5, where the audio signal comprises an alarm and where the alarm is silenced and the device is controlled to enable a snooze feature in response to the user touch path substantially matching the image path.

8. A method for operating an electronic device, the method comprising:

detecting a user touch within a given area of a displayed image, the displayed image comprising at least one characteristic indicating one or more functions of an application to be performed based on user interaction with the displayed image;

based on detecting the user touch, displaying at least a subset of a sequence of frames on a touch-sensitive display of the electronic device prior to a subsequent user touch, the at least a subset of the sequence of frames depicting the displayed image moving in an image path over a time interval to be followed by a user touch path;

based on displaying at least the subset of the sequence of frames, sensing the user touch path on the touch-sensitive display over the time interval, the user touch path being sensed as the user touch corresponding to the user touch path follows the at least the subset of the sequence of frames being displayed on the touch-sensitive display;

comparing the image path with the user touch path to determine a path tracking accuracy of the user touch path; and controlling an operation of the electronic device responsive to the determined path tracking accuracy of the user touch path, wherein controlling the operation of the electronic device comprises at least performing the one or more functions of the application.

9. The method of claim 8, where the image path comprises a straight line path or a curved path.

10. The method of claim 8, where a rate of change of position with respect to time of the displayed image varies over the time interval.

11. The method of claim 8, further comprising:
displaying an indicator of the image path during the time interval.

12. The method of claim 8, further comprising:
for each frame of the sequence of frames, displaying an indicator of a direction of motion of the displayed image.

13. The method of claim 8, further comprising:
controlling an audio signal dependent upon the path tracking accuracy over the time interval.

14. The method of claim 8, where the electronic device is operable as an alarm clock, and where controlling the electronic device responsive to the determined path tracking accuracy of the user touch path comprises:
if the path tracking accuracy is sufficiently high:
silencing an alarm emitted by the electronic device; and
enabling a snooze feature.

15. The method of claim 8, further comprising:
displaying a visual indicator of the path tracking accuracy over the time interval.

16. The method of claim 8, further comprising:
beginning the time interval in response to a user touch of the displayed image.

17. The method of claim 8, where comparing the image path with the user touch path to determine the path tracking accuracy comprises:
determining if the user touch is outside a region of the displayed image during the time interval.

18. The method of claim 8, where comparing the image path with the user touch path to determine the path tracking accuracy comprises:
determining a distance from a user touch position to an image position during the time interval.

19. The method of claim 8, where comparing the image path with the user touch path to determine the path tracking accuracy comprises:
determining a time integral of distance from a user touch position to an image position during the time interval.

20. The method of claim 8, where the time interval is dependent upon the path tracking accuracy.

21. The method of claim 8, where the displayed image comprises an image of a button or an icon.

22. The method of claim 8, further comprising:
selecting the image path at random.

23. The method of claim 8, further comprising:
selecting the image path from a predetermined set of image paths.

24. The method of claim 8, further comprising:
selecting a complexity of the image path dependent upon user input.

25. A method for operating an electronic device, the method comprising:
in a locked mode of the electronic device:
displaying a plurality of images on a touch-sensitive display of the electronic device, each image comprising a different characteristic indicating one or more selectable functions of the electronic device, wherein the selectable function is separate and distinct from, a function that at least one of locks and unlocks the electronic device;
in response to sensing a user touch of a selected image of plurality of images:
displaying at least a subset of a sequence of frames on the touch-sensitive display of the electronic device prior to a subsequent user touch, the at least a subset of the sequence of frames depicting the image moving in an image path over a time interval to be followed by a user touch path;
based on displaying at least the subset of the sequence of frames, sensing the user touch path on the touch-sensitive display over the time interval, the user touch path being sensed as the user touch corresponding to the user touch path follows the at least the subset of the sequence of frames being displayed on the touch-sensitive display;
comparing the image path with the user touch path to determine a path tracking accuracy of the user touch path; and
if the path tracking accuracy is above an accuracy threshold:
unlocking the electronic device; and
performing the function associated with the selected image.

26. The method of claim 25, where an image of the plurality of images is associated with a telephone function.

27. The method of claim 26, where;
a ring tone level of an incoming telephone call is reduced over the time interval if the path tracking is sufficiently accurate; and
an incoming telephone call is answered if the path tracking accuracy is above the accuracy threshold.

28. A non-transitory computer-readable medium having computer-executable instructions that, when executed by a processor, cause the processor to perform a method of:
detecting a user touch within a given area of a displayed image, the displayed image comprising at least one characteristic indicating one or more functions of an application to be performed based on user interaction with the displayed image;

based on detecting the user touch, displaying an initial subset of frames from a sequence of frames on a touch-sensitive display of an electronic device prior to a subsequent user touch, initial subset of frames depicting the displayed image moving in an image path over a time interval to be followed by a user touch path;

after displaying the initial subset of frames, detecting a plurality of subsequent user touches defining the user touch path, wherein for each subsequent touch of the plurality of subsequent touches displaying a different subset of frames from the sequence of frames on the touch-sensitive display, wherein each different subset of frames depicts the displayed image moving in a different image path over a time interval to be followed by the user touch path, and wherein the different image path is independent of the user touch path defined by one or more of the subsequent touches of the plurality of subsequent touches;

receiving data representative of the user touch path in response to the plurality of subsequent user touches having been detected;

comparing the image path with the user touch path to determine a path tracking accuracy of the user touch path; and controlling the electronic device responsive to the determined path tracking accuracy of the user touch path, wherein controlling an operation of the electronic device comprises at least performing the one or more functions of the application.

\* \* \* \* \*